United States Patent [19]

Hansen et al.

[11] Patent Number: 4,666,512
[45] Date of Patent: May 19, 1987

[54] METHOD FOR RECOVERING VANADIUM FROM VANADIUM-CONTAINING ORE

[75] Inventors: Donald J. Hansen, Lewiston; John B. Goddard, Grand Island, both of N.Y.; Oreste J. Malacarne, Grand Junction, Colo.

[73] Assignee: U.S. Vanadium Corp., Danbury, Conn.

[21] Appl. No.: 858,917

[22] Filed: May 2, 1986

Related U.S. Application Data

[63] Continuation-in-part of Ser. No. 724,557, Apr. 18, 1985, abandoned.

[51] Int. Cl.$^4$ .............................................. C22B 3/00
[52] U.S. Cl. ..................................... 75/101 R; 423/68
[58] Field of Search ........................ 75/101 R; 423/68

[56] References Cited

U.S. PATENT DOCUMENTS 3,777,004  12/1973  Lankenau et al. .................... 423/20
3,853,982  12/1974  Bare ..................................... 423/68
4,526,615  7/1985  Johnson ............................ 75/101 R

OTHER PUBLICATIONS

Zambrana et al., *Colorado Mining Assoc.* 1980, *Mining Yearbook*, pp. 141–149, 1980.

Primary Examiner—Melvyn J. Andrews

[57] ABSTRACT

Vanadium is recovered from vanadium-containing ores that have been roasted in the presence of a sodium source through heap leaching with an aqueous leaching solution so that high grade leach liquors can be obtained.

14 Claims, 3 Drawing Figures

METHOD FOR RECOVERING VANADIUM FROM VANADIUM-CONTAINING ORE

This is a continuation-in-part of application Ser. No. 724,557, filed Apr. 18, 1985, herein incorporated by reference, now abandoned.

This invention relates to a method for recovering vanadium from roasted vanadium-containing ores including vanadiferous clays and titaniferous magnetites.

BACKGROUND OF THE INVENTION

The conventional method for recovering vanadium from vanadium-containing ores includes as an initial step the roasting of the vanadium ore with a sodium salt to form roasted products which contain sodium vanadate in solid form. The roasted material is then cooled, crushed, ground and water leached in agitation leach tank(s) in a conventional manner. The solubilized sodium vanadate in solution is recovered from the solids through conventional solid-liquid separation such as filtration or counter-current decantation. The tailings are transported to a tailings pond and the sodium vanadate solution is processed for the recovery of vanadium. The latter step generally involves precipitating the vanadium as ammonium metavanadate. In some instances, the filtrate is evaporated after precipitation to recover the sodium salt and to avoid liquid effluent disposal.

In vanadium recovery methods, both the percentage of the total vanadium values that are recovered and the grade of the leach liquor, that is, the concentration of vanadium in the leach liquor, are important to the economics of the methods. Clearly, recovery methods are sought which not only enable a high percentage of recovery of vanadium but also provide a high grade of leach liquor.

Heap Leaching

Heap leaching processes have been proposed for recovery of various metal values from ores. In the heap leaching process, the ore is placed in a pile and the leaching liquor is placed on top of the ore and then seeps through the depth of the pile whereby metal values are dissolved in the liquor and the liquor is recovered at the bottom of the pile and treated to recover the metal values. For example, Zambrana, et al., in "Reprocessing of Uranium Tailings " by Heap Leaching Ranchers Exploration Naturita Project, *Colorado Mining Association* 1980 *Mining Yearbook*, pages 141 to 149, disclose the recovery of uranium and vanadium from old tailings using a modified vat heap leach. The heap leach methods can eliminate the need for capital and energy expenses involved with grinding, heating, agitation and liquids-solids separation associated with conventional agitated leaching processes.

SUMMARY OF THE INVENTION

By this invention processes are provided by which desirably high grade leaching solution can be obtained through heap leaching roasted vanadium-containing ores. Moreover, in an aspect of the invention, the high grade leaching solution can be obtained while still achieving a high percentage recovery of the vanadium in the ore. In another aspect of the invention, the concentration of calcium, a common contaminant in vanadium processing, can be minimized while still achieving desirable, high grade leaching solutions and high vanadium recoveries.

The method of the present invention comprises the steps of roasting a vanadium containing ore with a sodium source to form a roasted product containing sodium vanadate; piling the roasted product to form at least one heap in a manner to provide multiple sections; passing a leaching solution successively through different sections of the at least one heap until a desired concentration of vanadium in the leaching solution is obtained; and withdrawing said leaching solution from the at least one heap for processing to recover vanadium, e.g., as a solid vanadium product.

In a preferred aspect of the invention, the roasting of the ore is conducted under conditions such that the first water eluted through a freshly roasted, unleached sample has a pH of about 9.0 to 11.0, say, about 9.0 to 10.2, and most preferably about 9.5 to 10.0.

In another aspect of the invention, the pH of the leaching solution between successive stages is provided at a pH of about 8.5 to 11.0, say, about 9.0 to 10.5.

Preferably, the process is conducted to recover at least about 75, say, about 80 to 95, percent of the vanadium contained in the roasted ore in at least one of the sections of the heap. Frequently, the process is conducted such that successive sections are leached to recover at least about 75 percent of the contained vanadium.

The flux, i.e., the rate of leaching solution per unit area of the heap per unit time, is often about 5 to 2000, say, about 50 to 500, liters per square meter per day or the average rate of travel of the leaching solution through the heap usually is about 0.05 to 10, most often about 0.1 to 2, meters per day. Usually, the leaching solution is in contact with the heap for at least about 10 hours, preferably, about 10 to 1000, say 12 to 500, hours.

Preferably the leaching solution prior to contacting the heap is predominantly water, and most often is at least about 90 weight percent water, and may be distilled water or tap water. The leaching solution may contain adjuvants such as sodium carbonate to assist in the leaching. Generally, the leaching solution has a pH of at least about 7.

THE DRAWINGS

DETAILED DESCRIPTION OF THE INVENTION

Figure 1:
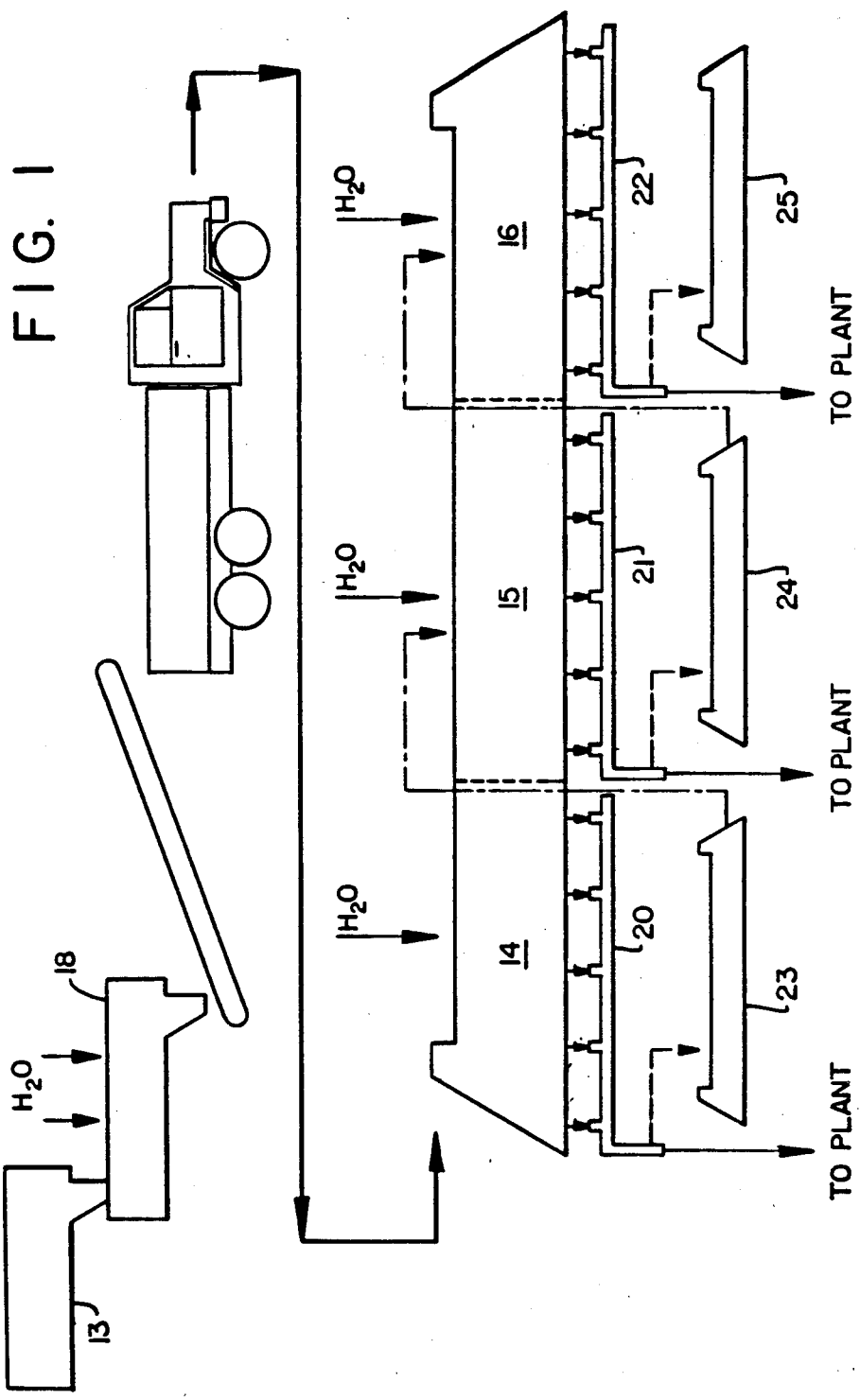
FIG. 1 is a diagrammatic illustration of the method of the present invention.

An embodiment of the present invention is diagrammatically illustrated in FIG. 1. The roasting operation involves roasting the vanadium containing ore with a sodium source, e.g., sodium hydroxide and sodium salts such as sodium carbonate, sodium sulfate, sodium chloride, etc., in a roaster 13 to form a roasted product containing sodium vanadate in solid form. Usually the ore is finely divided and admixed with the sodium source for roasting. The ore may have an average particle size less than about 5 millimeters, and is often minus 100 mesh, U.S. Sieve Series.

Roasting is usually at temperatures of at least about 800° C., depending upon the nature of the sodium source. For example, with sodium sulfate, temperatures of 1100° C. or more are desirable. Often the roast is conducted at maximum temperatures between about 1000° C. and 1300° C. Sometimes during roasting, the ore may tend to agglomerate; however, in such an event the agglomerates can often be easily attrited.

Advantageously, the roasted product is readily permeable and therefore the flow rate of the leaching solution can be controlled thereby enabling heap leaching in which relatively uniform and predictable flow rates of leaching solution containing vanadate values are achieved. Thus, rather than providing ponds on top of the heap, the process can be operated using a spray distribution of a desired rate of leaching solution on the heap.

The roasted ore is cooled in a cooler 18 and transported to a heap leach repository which may be relatively close to the roaster or the site of the ore deposit. The ore is piled into a heap consisting of a multiple number of sections 14, 15 and 16 and as many additional sections as may be desired based on the quantity of ore to be processed. Although the heap may be a pile extending upwardly from a surface and has slanted sides or may be placed within a container having side walls such as in a modified vat heap leaching process, the heap is typically built upon an impervious base constructed from a layer of material such as cement, asphalt, plastic, steel or compacted clay. Suitably spaced drainage tile is usually laid over the base and covered with a layer of gravel. The roasted ore is piled on top of the gravel to a desired height preferably between about 20 to 60 feet (about 6 to 18 meters). Leaching of each section 14, 15, 16, etc. is done solely with water or a water solution of sodium carbonate as will be discussed in more detail hereafter.

Figure 2:
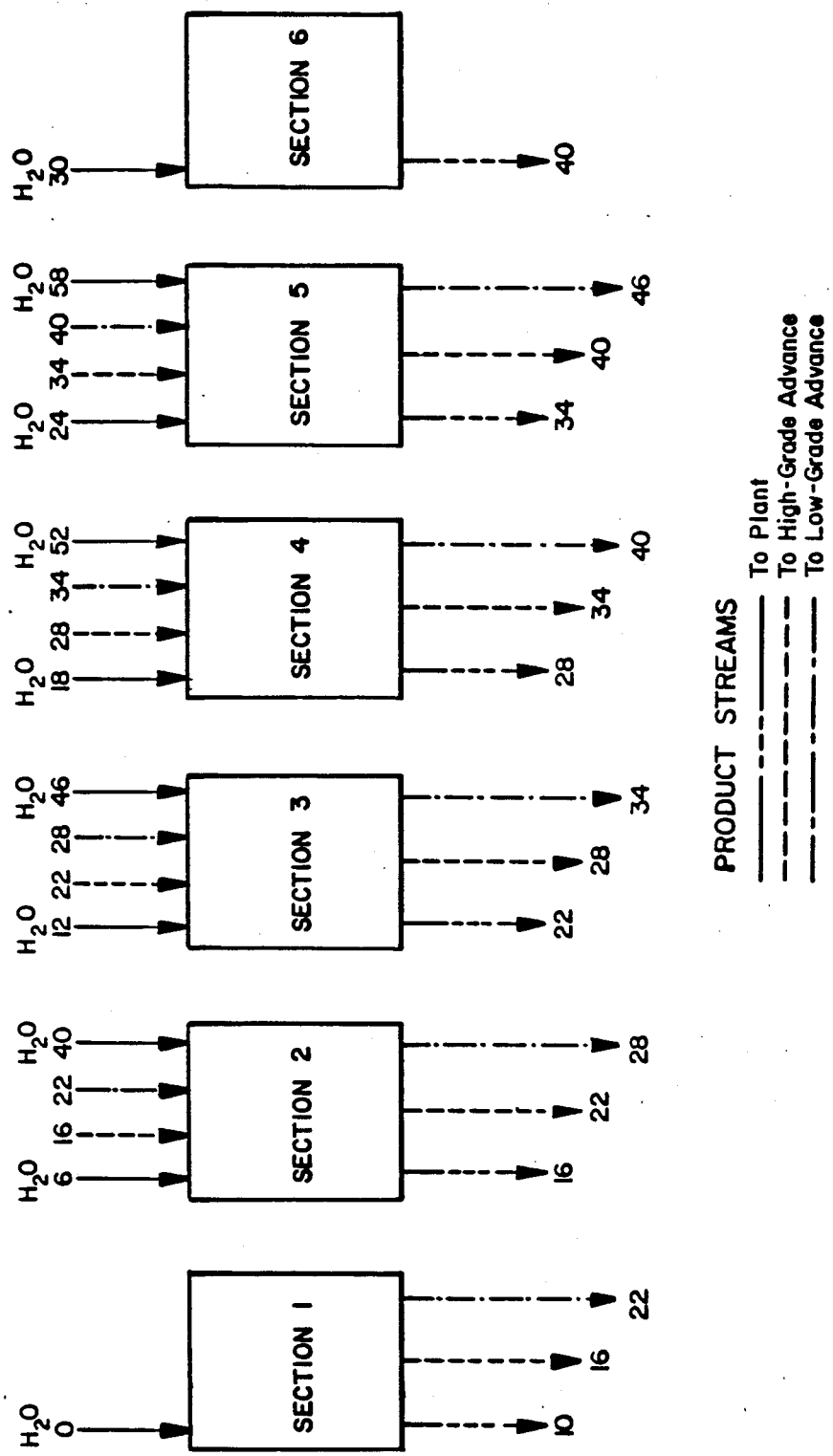
FIG. 2 is a diagrammatic sample operating schedule for heap leaching a vanadium containing ore in accordance with the present invention.

Leaching with water is begun on each section of the heap in succession following an operating schedule, an example of which is shown in FIG. 2, which will be discussed hereafter at reater length. With reference to FIG. 1, the water percolating through the heap 14, 15, or 16 dissolves the sodium vanadate and passes out of the heap through the drain tile into a header 20, 21, and 22 which directs the effluent to a plant for vanadium extraction or to a successive heap through a holding pond 23, 24 or 25 as will be discussed in connection with FIG. 2. The heap acts as a filter with the output liquor being a relatively clear solution with few fines. The concentration of sodium vanadate in the percolating liquor can be maintained at a high output grade by successive processing of low grade effluent through multiple sections of the heap. Accordingly the output effluent can provide a cumulative grade level substantially above the grade level presently obtained by agitation leaching. The advantage of being able to achieve a desired cumulative liquor grade for plant processing at a high recovery rate is a distinct advantage of the invention.

A sample operating schedule for heap leaching in accordance with the present invention is diagrammatically shown in FIG. 2.

Initially the solution is directed to the plant for processing the vanadium values since a desirable grade is achieved. Then the solution recovered from the bottom of Section 1 would be directed to a high-grade holding pond and would then be advanced to the next section, Section 2. After a period of time, i.e., when the grade of the leaching solution from Section 1 falls further, the leaching solution is directed to a low-grade holding pond. After passing the high-grade advance to Section 2, the low grade advance is passed to Section 2 to provide a higher grade material for passing to further sections. Once the desired recovery has been accomplished from Section 1, Section 1 is closed and the water is directed to Section 2. This procedure is repeated for each subsequent section.

Figure 3:
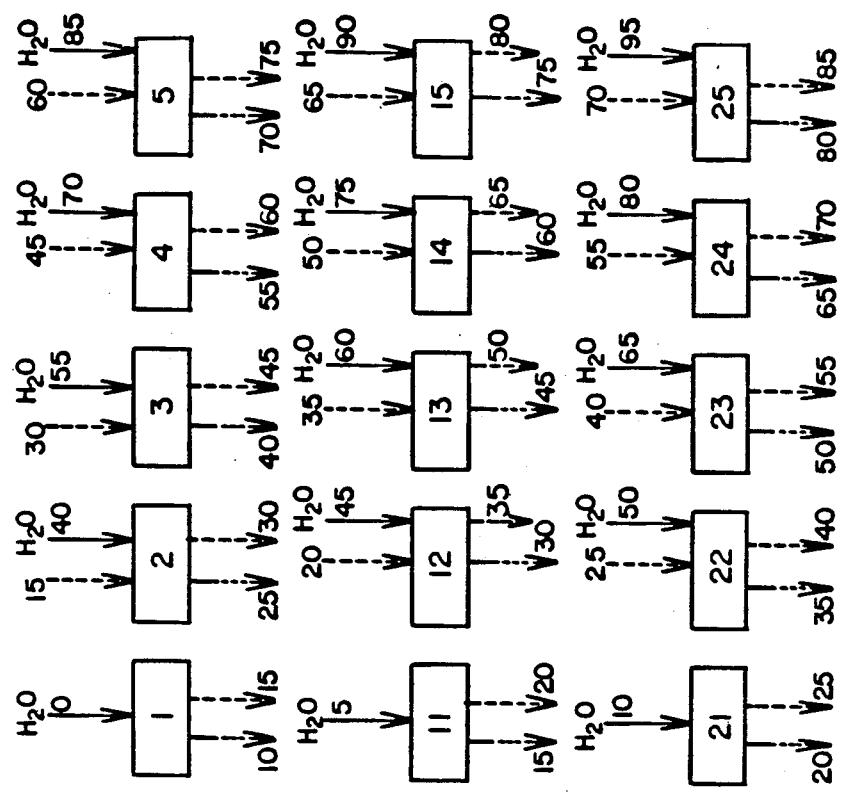
FIG. 3 is an alternative diagrammatic sample operating schedule to that of FIG. 2.

The operating schedule as depicted in FIG. 2 was devised to assure a continuous flow of concentrated leach solution to the plant. Each new section of heap is contacted first with fresh water before it sees solution advanced from another section. An alternative schedule of operation that would meet the criterion of continuous flow to the plant but would not require fresh water on each new section is shown in FIG. 3. For purposes of illustration consider three heaps, A, B, and C respectively, in which fresh water is added only to the first section of each.

For purposes of illustration of operations according to FIGS. 2 and 3, the following information is provided.

To provide a basis for understanding the assumptions made for the operations according to FIGS. 2 and 3, the following Tables have been provided to illustrate the relationship among the volume of leaching solution, the cumulative grade of vanadium in the total amount of leaching solution and the vanadium recovery.

TABLE I

COLUMN LEACH OF VANADIUM CALCINES IN A 3¼″ DIA. × 12″ HIGH COLUMN - 10 g/L $Na_2CO_3$ AQUEOUS SPRAY AT A NOMINAL FLOW RATE OF 120 liters/sq. meter/day

| Sample No. | Elapsed Time (HR) | Cumulative Volume (mL) | Cumulative Liquor Grade | | Actual Dissolved % $V_2O_5$ |
|---|---|---|---|---|---|
| | | | g/L $V_2O_5$ | g/L Ca | |
| 1. | — | 145 | 171.7 | 0.30 | 54.2 |
| 2. | — | 290 | 119.1 | 0.20 | 75.3 |
| 3. | 28.7 | 435 | 84.0 | 0.167 | 79.6 |
| 4. | 72.0 | 1470 | 27.9 | — | 86.8 |
| 5. | 100.25 | 2095 | 19.3 | 0.04 | 88.2 |

TABLE II

COLUMN LEACH OF VANADIUM CALCINES AS IN TABLE 1 USING TAP WATER SPRAY AT A NOMINAL FLOW RATE OF 120 liters/sq. meter/day

| Sample No. | Elapsed Time (HR) | Cumulative Volume (mL) | Cumulative Liquor Grade | | Actual Dissolved % $V_2O_5$ |
|---|---|---|---|---|---|
| | | | g/L $V_2O_5$ | g/L Ca | |
| 1. | — | 145 | 171.8 | 1.51 | 55.6 |
| 2. | 27.3 | 290 | 113.1 | 1.12 | 73.6 |
| 3. | 33.1 | 435 | 77.7 | 0.80 | 75.9 |
| 4. | 74.0 | 1470 | 23.9 | — | 79.0 |
| 5. | 100.25 | 2045 | 17.4 | 0.29 | 79.8 |

The five test samples in each Table illustrate how the liquor grade decreases as the volume of sample solution increases. The recovery of vanadium (calculated as vanadium oxide) also increases in proportion to the increase in the sampled output. The first sample represents a measurement approximately equal to one third the volume of solution required to fill up the voids in the sample column of ore used in the Table I experiment. The liquor grade for sample No. 1 in Table 1 was analyzed to be 171.7 grams per liter. Successive samples using the same volume measurement as in sample No. 1 were taken, analyzed for grade level and recorded. From the recorded data the average cumulative liquor grade can be established for any volume. The average cumulative liquor grade for the second volume i.e., Sample No. 2 was calculated to equal 119.1 grams per liter. Sample No. 2 represents a measure of approximately two-thirds the volume of solution required to fill up the voids in the sample column of ore in Table I. The third sample, representing a measure of three times the volume of solution used in the first sample, was calculated to have a cumulative liquor grade of 84 grams per liter. Approximately 80% of the vanadium was recovered in the first three volumes. To obtain a recovery of 88% $V_2O_5$ about 15 volume samples was required as indicated by Sample No. 5 which might not be practical in a commercial operation.

In Table I, sodium carbonate was added to the water spray whereas in Table II only tap water was sprayed onto the column. Table I shows that the addition of $Na_2CO_3$ inhibits calcium solubilization into the effluent liquor. The addition of sodium carbonate also raised the actual recovery of $V_2O_5$.

The Tables can provide a basis to project the grade of the leaching solution from each section.

The following may be assumed for purposes of this illustration in relation to the schedule of FIG. 2:

1. That the size of each heap section is 6 m high and 1 $m^2$ in area;
2. That the flow rate is 240 $L/m^2$/day;
3. That the bulk density is 2 tonnes/$m^3$;
4. That a "void volume" represents 200 L/tonne. A void volume, as known to those skilled in the art, is a measure of leaching solution, i.e., water with or without additives, required to fill the voids in the heap. Accordingly, each section contains $6 \times 2$ tonnes/$m^3$ = 12 tonnes of material and has a void volume of: 200 L/tonne $\times$ 12 tonnes = 2400 L. Since the flow rate is 240 $L/m^2$/day it will require 2400/240 or 10 days to pass one void volume. To pass 3 void volumes plus the void volume of solution to push solution through each section would require $4 \times 10 = 40$ days;
5. For the heap operation of FIG. 2 a concentration of 120 g/L was the desired minimum cumulative concentration to send to the plant for vanadium recovery. The minimum cumulative liquor grade should be at a level reasonably below the saturation level for the roasted product in the heap to avoid precipitation of vanadium values in the distribution pipes in the event of the evaporation of water.
6. That the passage of three void volumes of leaching solution (10 g/L sodium carbonate) through the heap will recover about 85 percent of the contained vanadium values and that the use of approximately 0.6 void volume of leaching solution yields a cumulative liquor grade of 120 grams/liter. These assumptions are based upon the data presented in Tables I and II.

It should be understood that depending on the nature of the ore and the roast conditions, the volume-grade relationship and vanadium recovery may vary.

The sequencing of the process described in FIG. 2 is discussed below. The numbers shown in FIG. 2 correspond to days beginning with day 0 when the leaching solution is added to Section 1. Although solution will begin to flow out the bottom before all the voids in the section have been filled, the solution is assumed to appear at day 10 (one void volume after flooding).

From days 10 to 16, the output from Section 1 is passed to the plant for the processing of the vanadium.

To assure a continuous flow of concentrated solution to the plant, liquid effluent should break through Section 2 on day 16. This is accomplished by spraying fresh leaching solution onto Section 2 on day 6. This spray of fresh leaching solution would be discontinued on day 16 when high-grade advance from Section 1, shown in FIG. 2 as a dotted line, is available.

Following this sequence, on day 22 concentrated solution breaks through Section 3 and is passed directly to the plant. High-grade effluent is advanced to Section 3 and low-grade from Section 1 (directed to a low-grade pond) is advanced to Section 2.

The operating schedule of FIG. 2 has Section 1 completed on day 40. Fresh leaching solution is then added to Section 2 as a wash.

FIG. 2 depicts only the first 0.6 void volumes from each section being directed to the plant for vanadium recovery. In practice, the advancing solution depicted by the dotted lines, (day 16 to day 22 in Section 1, etc.) when advanced to Section 2 will increase the grade of discharged effluent from Section 2 (days 22 to 28). After advancing through successive sections the grade would build to 120 g/L at which time it would be sent to the plant for processing. This should occur as the liquor is discharged from Section 4 during days 34 to 40.

In accordance with the present invention it has been found that spraying the heap with sodium carbonate solution will reduce the calcium ion concentration to acceptable concentrations so that the liquor leaving the heap does not have to be further processed to remove calcium. Accordingly, the preferred practice of the present invention includes adding sodium carbonate to the water spray or mixing it with the roasted ore. This eliminates reagent addition and filtration steps. Comparison of the calcium concentrations in Table I (which contains results with 10 g/L $Na_2CO_3$ spraying) with Table II, (tap water spraying) illustrates that calcium levels are reduced fivefold.

Comparison of the recoveries of vanadium reported in Table I and Table II reveal that the sodium carbonate spraying results in substantial improvement, e.g., 88.2% versus 79.8%. This probably results from the fact that $CaCO_3$ is less soluble than $Ca(VO_3)_2$ (calcium vanadate).

Reaction with sodium carbonate converts the calcium vanadate to the soluble sodium vanadate. The amount of sodium carbonate that should be added for optimum recovery is dependent on the calcium content of the ore, the ore composition and the roast conditions. An estimate of the minimum amount of sodium carbonate required can be obtained from the reaction:

$$Na_2CO_3 + Ca(VO_3)_2 \rightarrow CaCO_3 + 2NaVO_3$$

The strength of the carbonate solution is not critical but values from 5 to 20 g/L have been found effective.

As an alternative to spraying the heaps with sodium carbonate solution the sodium carbonate can be added during the construction of the heaps. The amount of sodium carbonate to be added is calculated from the above reaction. It may then be added as a concentrated solution and blended with the roasted product before it is placed on the heap. The heap would then be sprayed with water to obtain the low calcium, vanadium bearing solution.

The heap leach approach affords the opportunity to obtain more concentrated solutions than readily attained in conventional leaching. This is beneficial both in the precipitation of ammonium metavanadate (AMV) used in conventional processes to recover vanadium and in disposal of liquid effluent. The recovery of vanadium by the precipitation of AMV is a direct function of the vanadium concentration of the leach liquor. Moreover the amount of filtrate per kilogram of AMV recovered is less the more concentrated the solution. Thus disposal costs are less, particularly if the solution must be evaporated to dryness to avoid liquid disposal.

The operating schedule depicted in FIG. 2 provides a continuous flow of high grade leach solution to the plant. Each new section is first contacted with fresh leaching solution. Only after this initial contact is leach liquor that permeates another section of the heap used as the leaching solution.

FIG. 3 provides an alternative scheme providing a continuous flow of high grade leach liquor to the plant but does not use an initial fresh leaching solution on each section. In the system of FIG. 3, the use of three heaps, each containing five sections, is disclosed.

With respect to FIG. 3, the same assumptions as in FIG. 2 are applied except that only 0.5 void volume will be sent from each section prior to advance. As can be seen, solution would proceed to the plant from Heap A, Section 1, from day 10 to day 15.

At that time flow commences from Section 11, Heap B which is directed to the plant. Simultaneously flow from Heap A, Section 1 is advanced to Heap A, Section 2. On day 20 flow begins from Heap C, Section 21 and is directed to the plant while flow from Heap B, Section 11 is advanced to Section 12—and so on. Flow to the plant is uninterrupted and since less new water is added than in the operation of FIG. 2 the concentration of the advance will build up faster. This operation requires that more roasted product must be in-place before leaching begins causing an increase in "in process" inventory of ore.

As stated above, the nature of the ore and the roasting conditions can have an effect on the grade of leaching solution that can be obtained. Advantageously, the roast is conducted to provide a roasted product having both sodium metavanadate and sodium pyrovanadate species present (or their calculated equivalent). The amount of the vanadate species present can be affected by the amount and type of sodium source, e.g., sodium hydroxide, sodium chloride, sodium carbonate and/or sodium sulfate, present during the roast. In general, the more sodium, the higher the recovery of vanadium, and the greater basicity present, the more sodium pyrovanadate (and sodium orthovanade) and less sodium metavanadate that will be produced. Mixed sodium sources can be useful in achieving desirable recoveries of vanadium values with high grade leaching solutions.

Generally, greater amounts of sodium enhance recovery; however, the amounts of sodium that provide high recoveries frequently result in lower grade leaching solutions. By using mixtures of sodium sources, it sometimes is possible to provide increased recovery with little, if any, adverse effect on the grade of the leaching solution. For example, a more basic salt, e.g., sodium carbonate, may be used in combination with a neutral salt, sodium sulfate, to provide greater vanadium recovery with a higher grade of leaching solution than would be provided using the same amount of sodium but solely provided by sodium carbonate. Advantageously, the sodium source enables the production of a roasted product having an initial pH of between about 9.0 and 11.0.

Often the pH of the first eluant from a roast sample will be indicative of the grade of leaching solution that can be achieved. The first eluant sample for ascertaining the pH is obtained by placing approximately 70 grams of roasted product (approximately minus 20 mesh, U.S. Sieve Series) in a 50 milliliter burette and passing deionized water through the burette and collecting the 1.5 milliliters of eluant and ascertaining its pH. With initial pH's below about 9.0, and above about 11.0, the leaching solution cannot achieve high grades, e.g., at least about 150, say, at least about 180, grams per liter of water at 25° C. that can be obtained in the preferred aspects of this invention.

Kiehl, et al., in "A Study of Heterogeneous Equilibria in Aqueous Solutions of the Sodium Salts of the Vanadic Acids at 30° C.", *J. Am. Chem. Soc.*, Volume 59, pages 2118–26 (1937), discloses that with pure sodium vanadate compounds, the solubility of a mixture of sodium metavanadate and sodium pyrovanadate can have a greater solubility than either sodium metavanadate alone or sodium pyrovanadate alone. Several examples were conducted using roasted magnetite concentrate to ascertain the relationship between the pH and grade of eluant on the belief that pH and metavanadate/pyrovanadate ratio are related.

For these experiments, the magnetite ore was analyzed to contain:

| Component | Weight Percent |
| --- | --- |
| $V_2O_5$ | 1.97 |
| Fe | 55.7 |
| $SiO_2$ | 1.66 |
| Mg | 0.55 |
| $Al_2O_3$ | 3.54 |
| $TiO_2$ | 6.47 |
| Ca | 0.72 |

In each instance, the ore is roasted with salt at 1050° C. for 2 hours with an air flow rate in the furnace of four liters per minute. Table III summarizes the composition of the roasted product and initial pH and grade of the first sample obtained using 80 grams of sample in a 50 milliliter burette. The ore samples were first saturated with distilled water (the saturation time is the period during which the water was added to the sample) and then either eluted or allowed to soak prior to elution. For experiments 5 to 14, the initial eluted sample was 1.5 milliliters rather than 1.0 milliliters as in experiments 1 to 4.

TABLE III

| Experiment | Grams of $Na_2CO_3$ per 100 g of Magnetite | Saturation Time/hr | Soak Time/days | Initial pH | Initial Grade g $V_2O_5$/L | Percent Recovery |
| --- | --- | --- | --- | --- | --- | --- |
| 1[a] | 10 | 1 | eluted | 12.6+ | 147 | 95.6 |
| 2[a] | 5 | 1 | eluted | 10.95 | 135 | 90.0 |
| 3[a] | 3 | 1 | eluted | 9.75 | 181 | 82.1 |
| 4[a] | 4 | 1 | eluted | 10.80 | 168 | 84.9 |
| 5[b] | 3.5 | 8 | 3 | 10.21 | 162 | 73.9 |
| 6[b] | 4 | 8 | 3 | 10.45 | 172 | 86.7 |
| 7 | 3 | 2 | 3 | 9.80 | 246 | 82.2 |
| 8 | 2 | 2 | 1 | 8.40 | 117[c] | 72.7 |
| 9 | 2.5 | 2 | 1 | 9.40 | 206 | 78.8 |
| 10 | 2.75 | 2 | 1 | 9.62 | 186 | 82.7 |

TABLE III-continued

| Experiment | Grams of $Na_2CO_3$ per 100 g of Magnetite | Saturation Time/hr | Soak Time/days | Initial pH | Initial Grade g $V_2O_5$/L | Percent Recovery |
|---|---|---|---|---|---|---|
| 11 | 3.25 | 2 | 1 | 10.00 | 158 | 83.9 |
| 12 | 3.3+ | 2 | 1 | 10.05 | 207 | — |
| 13 | 0.4 g $Na_2SO_4$ 2.825+ | 2 | 1 | 9.84 | 213 | 84.4 |
| 14 | 1.0 g $Na_2SO_4$ 2.4+ 1.6 g $Na_2SO_4$ | 2 | 1 | 9.68 | 188[d] | 79.4 |

[a]Elution rate of approximately 3.5 minutes per milliliter of sample.
[b]Air pockets formed in roasted sample and may have effected results.
[c]Second 1.5 milliliter sample. The first sample had a grade of 104 g/L.
[d]Cloudy and a precipitate formed.

The results appear to evidence the complexity of the chemistry of heap leaching roasted vanadium-containing ores. The highest recovery of vanadium was made in experiment 1, although it had relatively little contact time. Experiment 3 was conducted under substantially the same conditions but had a pH more indicative of that expected when both metavanadate and pyrovanadate are present. The grade, however, was somewhat higher, but with substantially less recovery. In comparison, in experiment 7 which involved a three day soak which more approximates heap leaching, the recovery is approximately the same as that in experiment 3, yet the grade is substantially higher, 246 g/L versus 181 g/L.

We claim:

1. A method for recovering vanadium from vanadium-containing ores comprising the steps of roasting a vanadium containing ore with a sodium source to form a roasted product containing sodium vanadate; piling the roasted product to form at least one heap in a manner to provide multiple sections; passing an aqueous leaching solution successively through different sections of the at least one heap until a desired vanadium concentration in the leaching solution is obtained; and then withdrawing the leaching solution from the at least one heap.

2. The method as defined in claim 1 wherein concentration of vanadium in the leaching solution when it is withdrawn from the at least one heap is at a level reasonably close to the saturation level for said roasted product and below the level at which precipitation will occur.

3. The method as defined in claim 1 wherein the leaching solution comprises water and sodium carbonate in an amount sufficient to enhance the recovery of sodium vanadate.

4. A method as defined in claim 3 wherein the leaching solution consists of water and 5 to 20 grams of sodium carbonate per liter prior to being passed to the at least one heap.

5. The method as defined in claim 1 wherein sodium carbonate is mixed into the roasted product before it is piled into a heap.

6. The method of claim 1 wherein the roasted product exhibits an initial pH of between about 9.0 and 11.0.

7. The method of claim 6 wherein the sodium salt for the roasting comprises sodium carbonate.

8. The method of claim 7 wherein the pH of the leaching solution passing between sections of the at least one heap provided at 9.0 to 11.0.

9. The method of claim 7 wherein the leaching solution passes through a section of the heap for at least 10 hours.

10. The method of claim 7 wherein the concentration of the vanadium ($V_2O_5$) in the leaching solution withdrawn from the at least one heap is at least 180 grams per liter.

11. The method of claim 6 wherein the sodium source for roasting comprises sodium hydroxide, sodium chloride, sodium carbonate or sodium sulfate or mixtures thereof to provide a roasted product exhibiting an initial pH of between about 9.0 and 10.2.

12. The method of claim 11 wherein sufficient sodium source is provided for roasting to enable recovery of at least about 75 percent of the sodium vanadate from the ore.

13. The method of claim 6 wherein a mixture of sodium sources are used for roasting such that the roasted product exhibits an initial pH of between about 9.0 and 10.2.

14. The method of claim 13 wherein sufficient sodium source is provided for roasting to enable recovery of at least about 75 percent of the contained vanadium in the ore.

* * * * *